(12) United States Patent
Sheng et al.

(10) Patent No.: US 11,724,520 B2
(45) Date of Patent: Aug. 15, 2023

(54) PERIPHERAL WITH PIVOTAL TURN-OVER GUIDE MECHANISM

(71) Applicant: AVISION INC., Hsinchu (TW)

(72) Inventors: Shao-Lan Sheng, Hsinchu (TW); Min-Tung Huang, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 17/686,767

(22) Filed: Mar. 4, 2022

(65) Prior Publication Data

US 2022/0314643 A1 Oct. 6, 2022

(30) Foreign Application Priority Data

Apr. 1, 2021 (TW) ................. 110112036

(51) Int. Cl.
| | | |
|---|---|---|
| *B41J 3/60* | (2006.01) | |
| *B41J 13/00* | (2006.01) | |
| *H04N 1/00* | (2006.01) | |
| *G03G 15/23* | (2006.01) | |
| *B41J 2/47* | (2006.01) | |
| *H04N 1/04* | (2006.01) | |

(52) U.S. Cl.
CPC ................. *B41J 3/60* (2013.01); *B41J 2/471* (2013.01); *B41J 13/0045* (2013.01); *G03G 15/231* (2013.01); *H04N 1/00278* (2013.01); *H04N 1/00485* (2013.01); *H04N 1/00572* (2013.01); *H04N 1/04* (2013.01)

(58) Field of Classification Search
CPC .......... B41J 3/60; B41J 13/0045; B41J 2/471; H04N 1/00572; H04N 1/00278; H04N 1/00485; H04N 1/04; G03G 15/231
See application file for complete search history.

(56) References Cited

U.S. PATENT DOCUMENTS

| | | | |
|---|---|---|---|
| 7,607,659 | B2 | 10/2009 | Fukatsu et al. |
| 2004/0201159 | A1 | 10/2004 | Sheng et al. |
| 2005/0285322 | A1 | 12/2005 | Sheng et al. |
| 2007/0152394 | A1 | 7/2007 | Sheng et al. |

(Continued)

FOREIGN PATENT DOCUMENTS

| | | |
|---|---|---|
| CN | 1769153 A | 5/2006 |
| CN | 111252612 A | 6/2020 |

(Continued)

*Primary Examiner* — Henok D Legesse
(74) *Attorney, Agent, or Firm* — Muncy, Geissler, Olds & Lowe, P.C.

(57) ABSTRACT

A peripheral with a pivotal turn-over guiding mechanism includes: a transporting mechanism; first to third passages; an image processing unit disposed on the first passage, wherein after the image processing unit performs a first image process on a first side of a medium, the transporting mechanism transports the medium into, partially out of and back into the second passage, into the third passage, and then into the first passage, and the image processing unit performs a second image process on a second side of the medium; and a guide member, which is rotatably disposed at a connection portion of the third passage, the second passage and the first passage, normally closes a forward path from the first passage to the second passage, and normally opens a reverse path from the second passage to the third passage.

15 Claims, 7 Drawing Sheets

(56) References Cited

U.S. PATENT DOCUMENTS

| | | |
|---|---|---|
| 2008/0169596 A1 | 7/2008 | Wu |
| 2013/0149018 A1* | 6/2013 | Oh .............................. B41J 3/60 399/381 |
| 2020/0172363 A1 | 6/2020 | Ueno et al. |
| 2020/0307945 A1 | 10/2020 | Mori et al. |

FOREIGN PATENT DOCUMENTS

| | | |
|---|---|---|
| TW | 200420484 A | 10/2004 |
| TW | 200804089 A | 1/2008 |

\* cited by examiner

PERIPHERAL WITH PIVOTAL TURN-OVER GUIDE MECHANISM

CROSS-REFERENCE TO RELATED APPLICATIONS

This application claims priority of No. 110112036 filed in Taiwan R.O.C. on Apr. 1, 2021 under 35 USC 119, the entire content of which is hereby incorporated by reference.

BACKGROUND OF THE INVENTION

Field of the Invention

This disclosure relates to a peripheral, and more particularly to a peripheral with a pivotal turn-over guiding mechanism.

Description of the Related Art

At present, when a laser printer is performing duplex document printing, each of the documents needs to be turned over at least twice to keep the order of the printed documents. In one example, after a first side of the document has been printed, the document needs to be transported out temporarily, and then the document enters a turn-over passage, so that a second side of the document is printed after the first turn-over process. Next, the document can be transported to the output tray. If the document needs to be controlled to be temporarily transported out of the passage and then enters the turn-over passage, then a connection portion of three sub-passages needs to be designed to prevent the malfunction. Thus, the connection portion of the three sub-passages needs to occupy a relatively large space to prevent the document from entering the incorrect sub-passage. Alternatively, an active guiding mechanism is required to actively guide the document into the correct sub-passage.

The guiding mechanism needs an additional driving mechanism to perform the active control, or the larger space is required to design the connection portion of these sub-passages. So, the printer has the high cost and the large size, and this is not advantageous to the current requirements of the low cost and the slim and light properties.

BRIEF SUMMARY OF THE INVENTION

It is therefore an objective of this disclosure to provide a peripheral with a pivotal turn-over guiding mechanism used to achieve the advantages of decreasing the cost and size.

To achieve the above-identified object, this disclosure provides a peripheral with a pivotal turn-over guiding mechanism. The peripheral includes: a transporting mechanism; a first passage; an image processing unit disposed on the first passage; a second passage connected with the first passage, wherein the image processing unit performs a first image process on a first side of a medium, and then the transporting mechanism transports the medium to the second passage; a third passage connected with the first passage and the second passage, wherein the transporting mechanism transports the medium, which has encountered the first image process, partially out of and back into the second passage, into the third passage, and then into the first passage from the third passage, so that the image processing unit performs a second image process on a second side of the medium; and a guide member, which is rotatably disposed at a connection portion of the third passage, the second passage and the first passage, normally closes a forward path from the first passage to the second passage, and normally opens a reverse path from the second passage to the third passage, wherein the medium coming from the first passage pushes the guide member to open the forward path, and the medium coming from the second passage is guided into the third passage by the guide member without entering the first passage.

With the peripheral of the above-mentioned embodiment, no additional driving mechanism is required to perform the active control, and the larger space is not needed for the design of the connection portion of these sub-passages. So, the size and the cost of the peripheral can be decreased, and this is quite beneficial to the current requirements of the low cost and the slim and light properties.

In order to make the above-mentioned content of this disclosure more obvious and be easily understood, preferred embodiments will be described in detail as follows in conjunction with the accompanying drawings.

DETAILED DESCRIPTION OF THE INVENTION

In this disclosure, a peripheral is designed mainly using a pivotal turn-over guiding mechanism without an active actuator, wherein the peripheral may be one of document processing devices, such as a printer, a scanner and the like. Because the pivotal turn-over guiding mechanism is used, the advantages of decreasing the cost and the size can be obtained.

Figure 1:
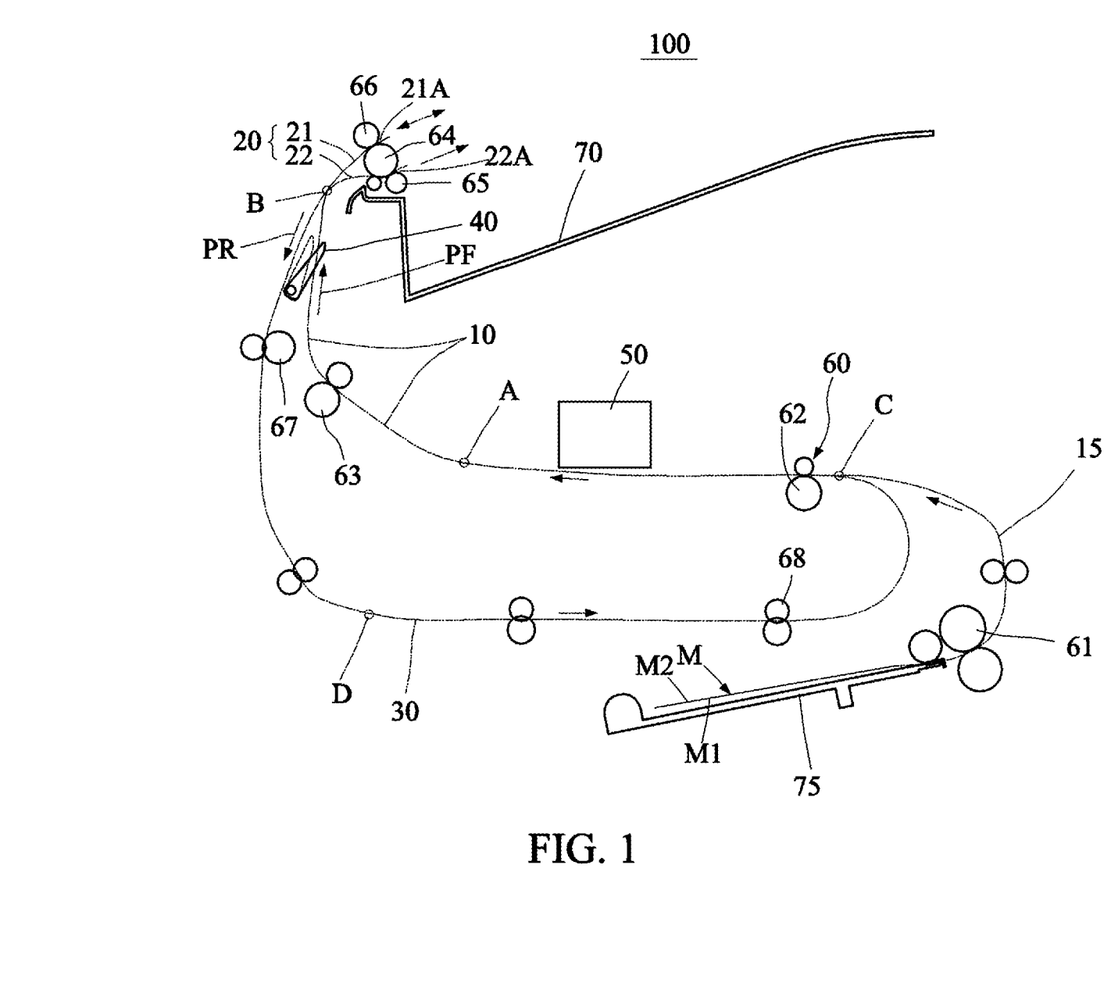
FIG. 1 is a schematic view showing paths of a peripheral according to a preferred embodiment of this disclosure.
Figure 2:
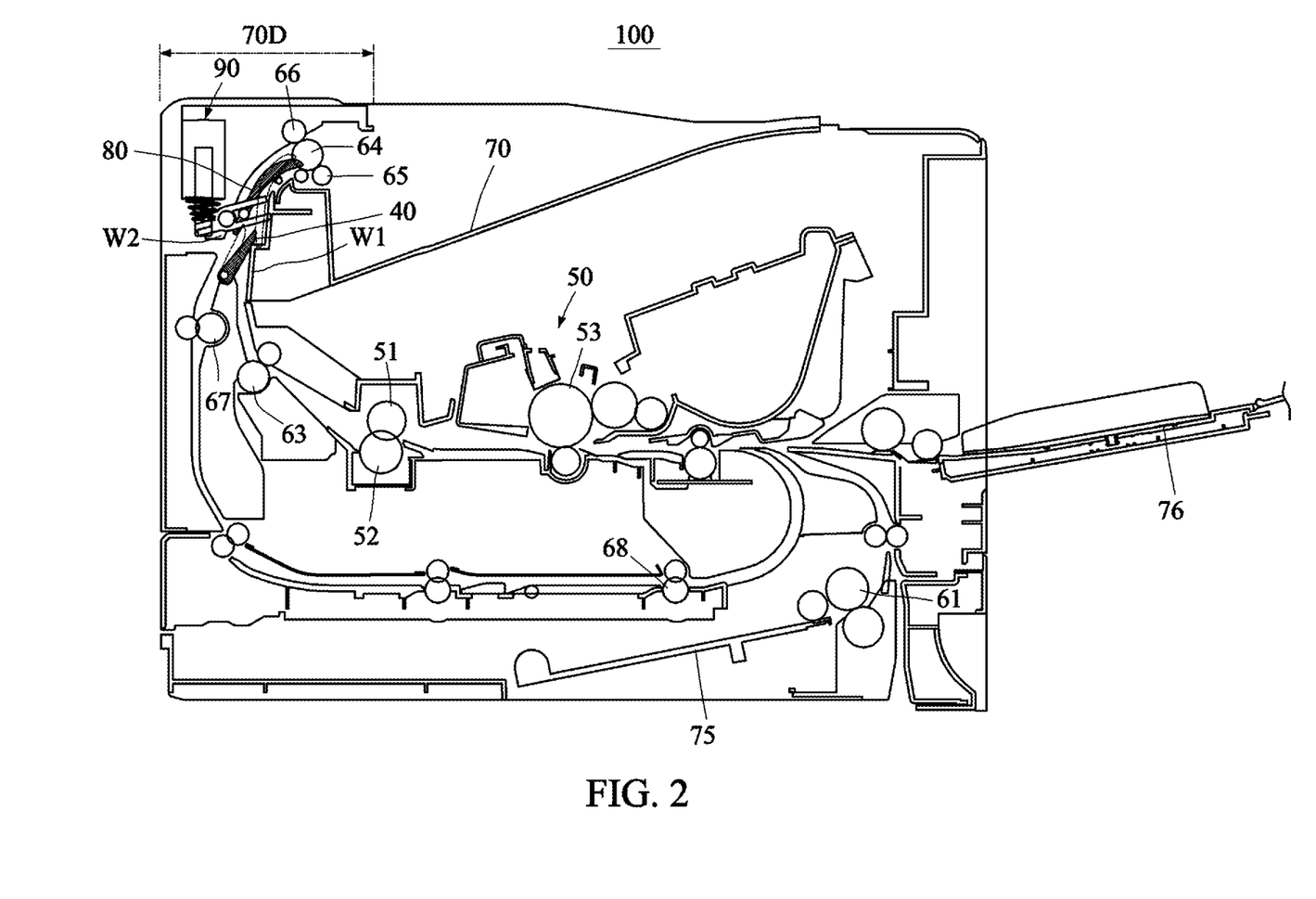
FIG. 2 is a schematic view showing detailed structures of the peripheral of FIG. 1.

FIG. 1 is a schematic view showing paths of a peripheral according to a preferred embodiment of this disclosure. FIG. 2 is a schematic view showing detailed structures of the peripheral of FIG. 1. FIGS. 3A to 3D are partially enlarged schematic views showing four states of the peripheral of FIG. 2. Referring to FIGS. 1 and 3A to 3D, this embodiment provides a peripheral 100 with a pivotal turn-over guiding mechanism. The peripheral 100 includes a transporting mechanism 60, a first passage 10, an image processing unit 50, a second passage 20, a third passage 30 and a guide member 40.

The image processing unit 50 is disposed on the first passage 10. The second passage 20 is connected with the first passage 10. Although the second passage 20 is depicted in a dual-passage manner, the second passage 20 may also be implemented in a single-passage manner in other embodiments. The image processing unit 50 performs a first image process on a first side M1 of a medium M, and then the transporting mechanism 60 transports the medium M to the second passage 20. The third passage 30 connects the first passage 10 with the second passage 20. The transporting mechanism 60 transports the medium M, which has encountered the first image process, partially out of the second passage 20, then back into the second passage 20, then into the third passage 30, and then into the first passage 10 from the third passage 30, so that the image processing unit 50 performs a second image process on a second side M2 of the medium M. The guide member 40 is rotatably disposed at a connection portion CP of the third passage 30, the second passage 20 and the first passage 10, normally closes a forward path PF from the first passage 10 to the second passage 20, and normally opens a reverse path PR from the second passage 20 to the third passage 30. In order to achieve the effect of this embodiment, the medium M coming from the first passage 10 pushes the guide member 40 to open the forward path PF, and the medium M coming from the second passage 20 is guided, by the guide member 40, into the third passage 30 without entering the first passage 10. With the above-mentioned structures, the advantages of this disclosure can be achieved.

Optionally, the second passage 20 includes a bidirectional passage 21 and a unidirectional passage (or one-way passage) 22. The bidirectional passage 21 is connected with the first passage 10, the third passage 30 and an output tray 70. The unidirectional passage 22 is connected with the first passage 10, the third passage 30 and the output tray 70. The transporting mechanism 60 transports the medium M past the bidirectional passage 21 in a forward direction and in a reverse direction, and transports the medium M past the unidirectional passage 22 in the forward direction. Thus, when the first medium passes the guide member 40 and is transported out of the unidirectional passage 22, the second medium enters the third passage 30 from the bidirectional passage 21 through the guide member 40, so that the effect of speeding up the document processing can be obtained. In this embodiment, the forward path PF is an upward path, and the reverse path PR is a downward path.

The transporting mechanism 60 includes rollers 61 to 68, which cooperate to transport the medium M. In one example, the medium M, placed in a supply tray 75, is transported by the roller 61 into an input passage 15, and then enters the first passage 10 through a point C (a connection portion of the first passage 10, the third passage 30 and the input passage 15). Then, the medium M is transported, by the roller 62, past the image processing unit 50 performing the first image process, and then past a point A. Next, the medium M is transported, by the roller 63, to the guide member 40 to push the guide member 40. Then, the medium M passes a point B (a connection portion of the first passage 10, the second passage 20 and the third passage 30), and enters the bidirectional passage 21 of the second passage 20. After the medium M is temporarily transported out by the rollers 64 and 66 without separating from the rollers 64 and 66, the roller 64/66 reverses to transport the medium M into the bidirectional passage 21. Then, the medium M enters the third passage 30 through the guide member 40, is transported, by the roller 67, past a point D, is then transported, by the roller 68, past the point C. and then enters the first passage 10 again. Therefore, the bidirectional passage 21 of the second passage 20 and the third passage 30 are a passage group provided for the medium M to turn over. Thus, when the medium M passes the point C at the second time, the medium M is in a turn-over state and then passes the image processing unit 50 for performing the second image process. Next, the medium M passes the point A and the guide member 40, enters the unidirectional passage 22 of the second passage 20, and is then outputted to the output tray 70.

Alternatively, when the medium M further needs to be turned over again, it is possible to prevent the medium M from entering the unidirectional passage 22. Instead, the medium M again enters the bidirectional passage 21 so that the medium M is temporarily transported out of and then back into the bidirectional passage. Then, the medium M enters the third passage 30, passes the point D and the point C, and then enters the first passage 10 again. Next, the medium M passes the image processing unit 50, which may not perform the image processing, and then passes the point A and the guide member 40. Finally, the medium M is transported from the unidirectional passage 22 to the output tray 70.

Of course, the peripheral 100 may further include a manual feed tray 76, into which a user can manually place another medium, which is transported past the point C and into the first passage 10.

The image processing unit 50 may be a printing module for printing data on the medium M. In one example, the printing module is a laser printing module for transfer printing dry toner onto the medium M through a drum 53, and then performing a high-temperature fixation process on the dry toner on the medium M through a pressure roller 51 and a heating roller 52 of the image processing unit 50. Because the medium M encounters the pressing and heating treatment, the temperature of the medium M passing the guide member 40 is relatively high. By designing the guide member 40 as a hard member or a member that can withstand the high temperature of the high-temperature fixation process, it is possible to ensure the normal operation and the long-term service lifetime of the guide member 40, and the guide member 40 cannot be softened and become failed due to the influence of the high temperature.

Alternatively, the image processing unit 50 may be an optical image scanning module for acquiring an image of the medium M. In this case, the guide member 40 may be a soft member present in the form of a sheet, which keeps normally closing a path between the first passage 10 and the second passage 20 by its own resilient force and/or weight.

In addition, the peripheral 100 may further include a switching gate 80, which is disposed between the bidirectional passage 21 and the unidirectional passage 22, and switches between a first state and a second state. In the first state (see FIG. 4), the medium M enters the bidirectional passage 21 from the first passage 10, and enters the third passage 30 from the bidirectional passage 21. In the second state (see FIG. 5), the medium M enters the unidirectional passage 22 from the first passage 10.

Figure 3A:
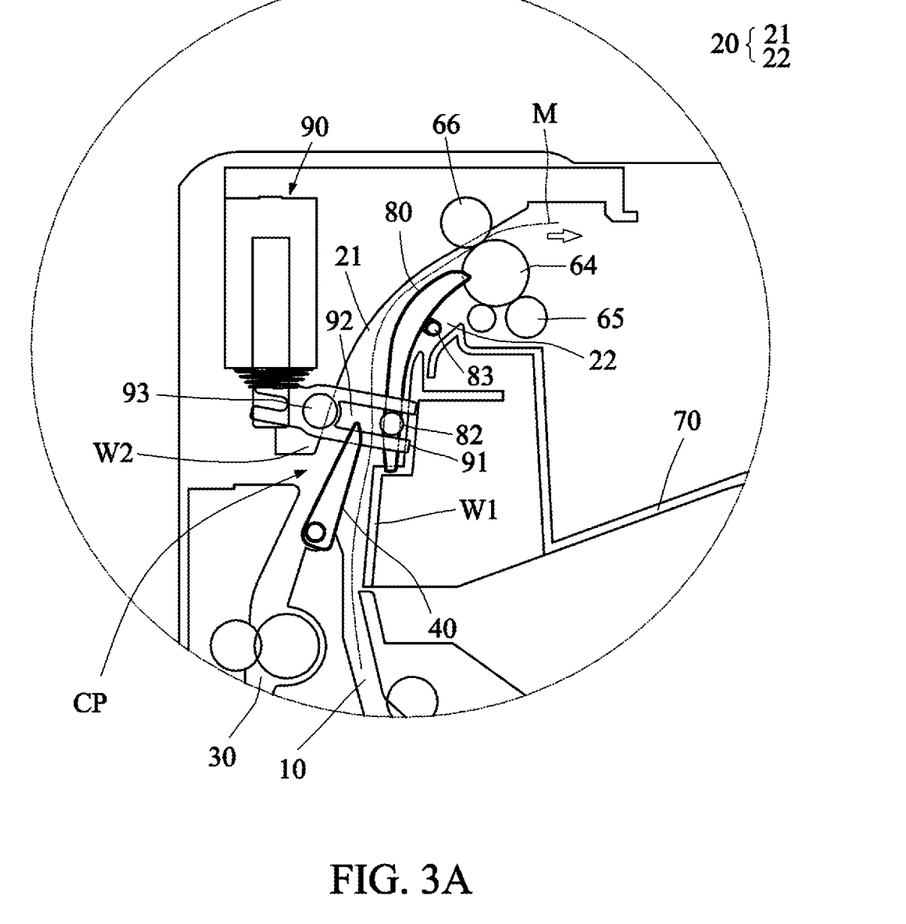
FIGS. 3A to 3D are partially enlarged schematic views showing four states of the peripheral of FIG. 2.
Figure 3B:
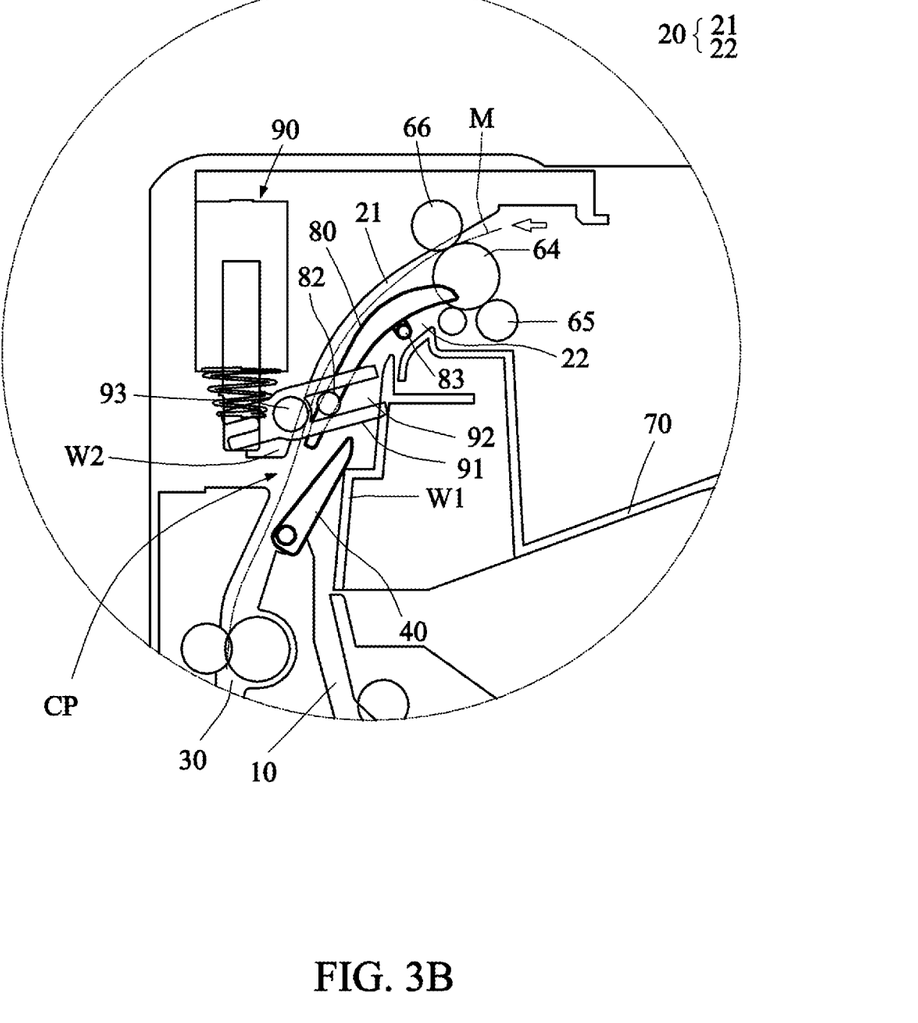
Figure 3C:
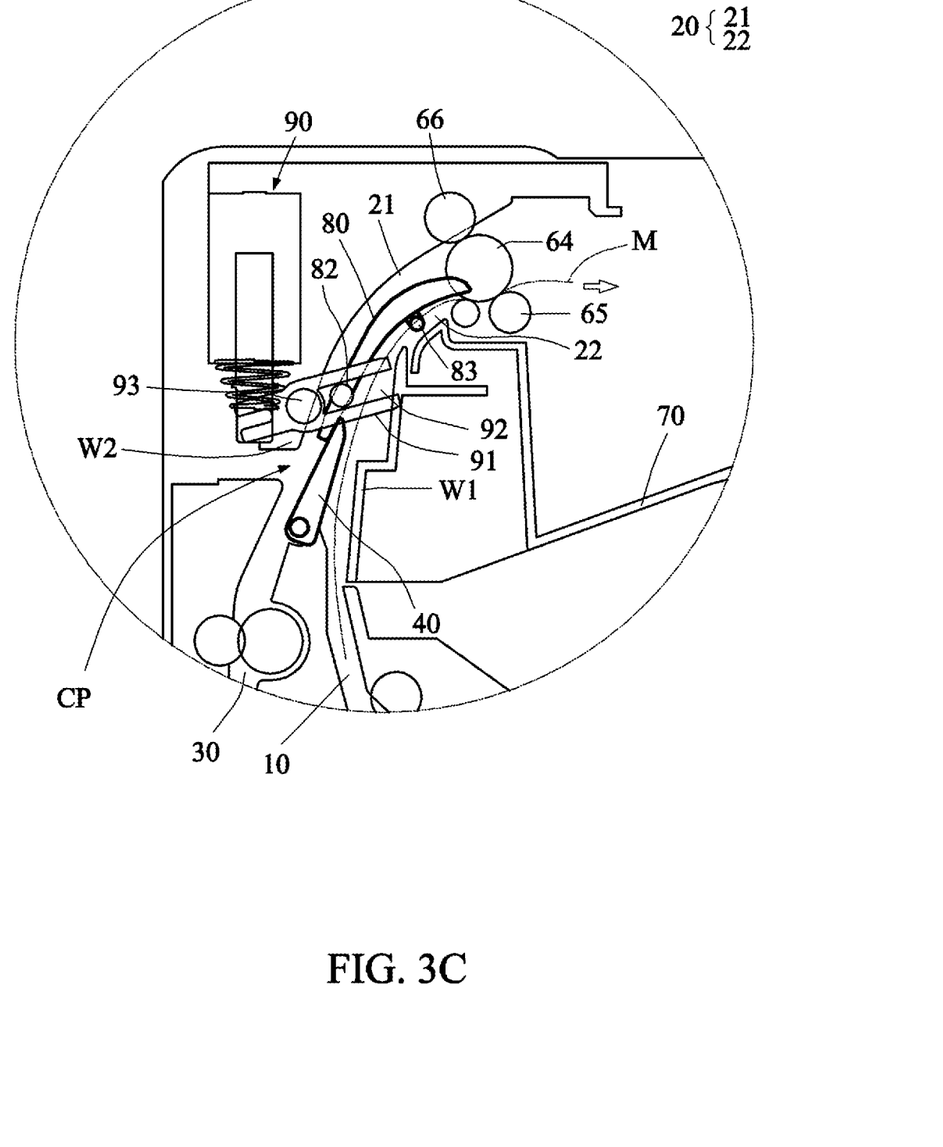
Figure 3D:
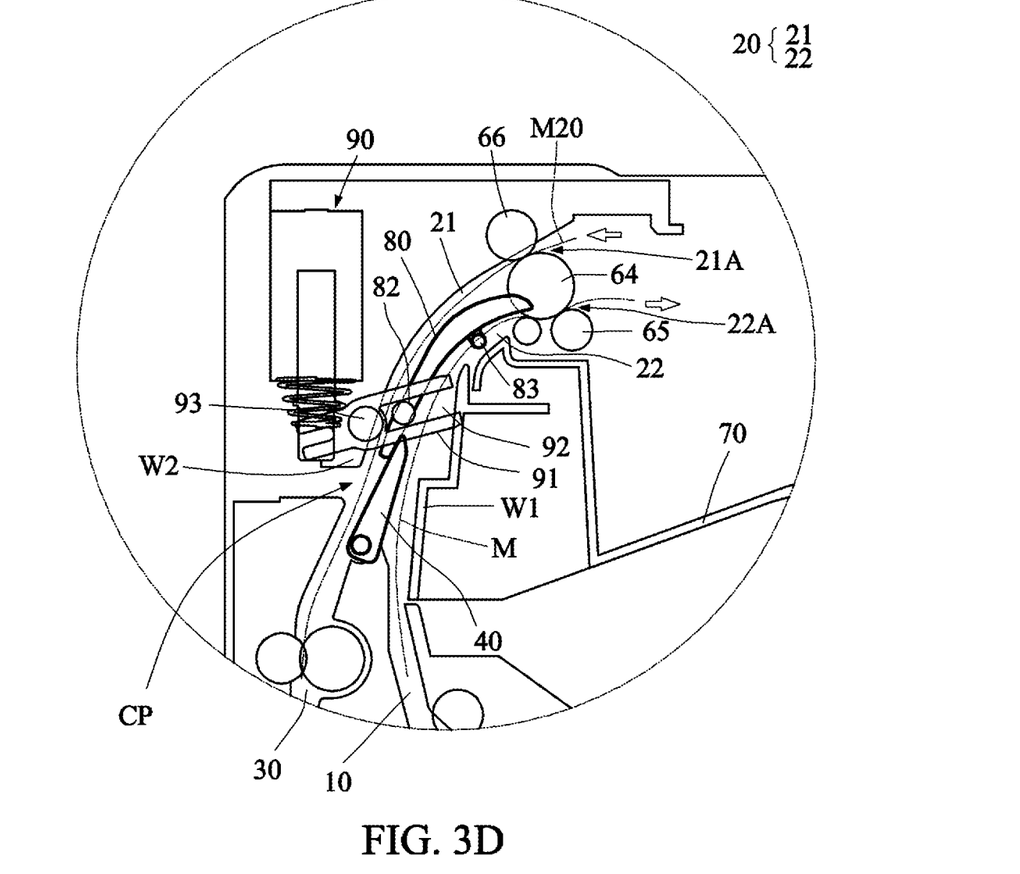

The path of the medium M present under the guiding of the guide member 40 and the switching gate 80 will be described in the following. First, the medium M, which has encountered the first image process, enters the bidirectional passage 21 of the second passage 20 from the first passage 10, and is outputted from a nip between the rollers 64 and 66 without separating from the rollers 64 and 66, as shown in FIG. 3A. Next, as shown in FIG. 3B, the medium M is transported from the nip between the rollers 64 and 66 back to the bidirectional passage 21 and enters the third passage 30. Then, the medium M enters the first passage 10 from the third passage 30. At this time, the guide member 40 is not pushed away by the medium M and does not close the path from the first passage 10 to the second passage 20. Then, as shown in FIG. 3C, the medium M, which has encountered the second image process, enters the unidirectional passage 22 of the second passage 20 from the first passage 10, and is outputted from a nip between the rollers 64 and 65, as shown in FIG. 3C. Of course, if there is a second medium M20 following the medium M, then the second medium M20 can enter the third passage 30 from the bidirectional passage 21 when the medium M is being outputted from the unidirectional passage 22, as shown in FIG. 3D. As shown in FIGS. 3D and 1, because an outlet 22A of the unidirectional passage 22 is disposed below or under an outlet 21A of the bidirectional passage 21, or the outlet 22A is disposed between the outlet 21A and the image processing unit 50, the above-mentioned operations can be achieved without inducing the phenomenon that two media interfere with each other, and the document processing can be speeded up.

Figure 4:
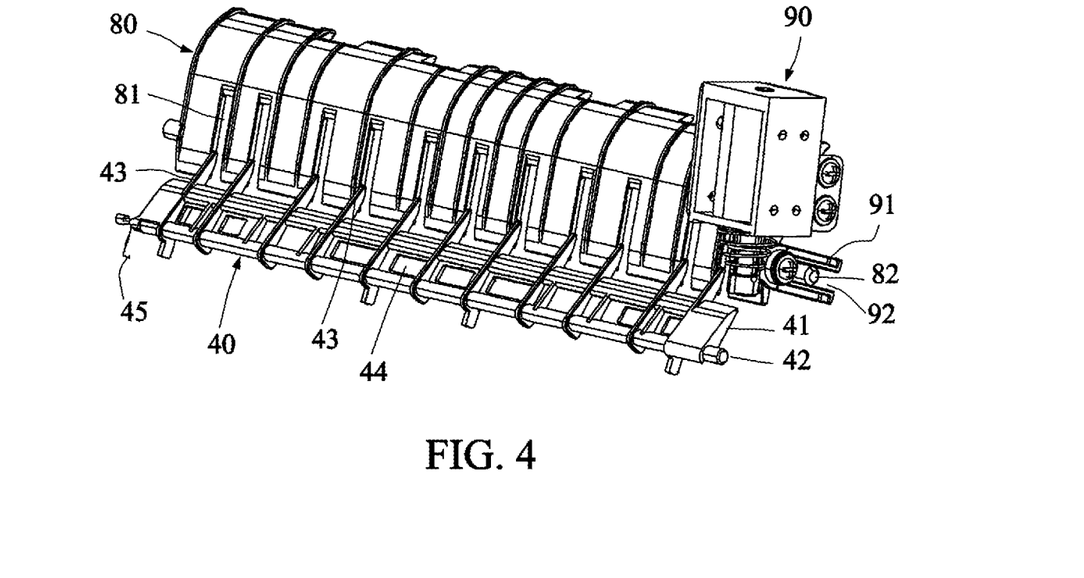
FIG. 4 is a pictorial view showing a switching gate in a first state.
Figure 5:
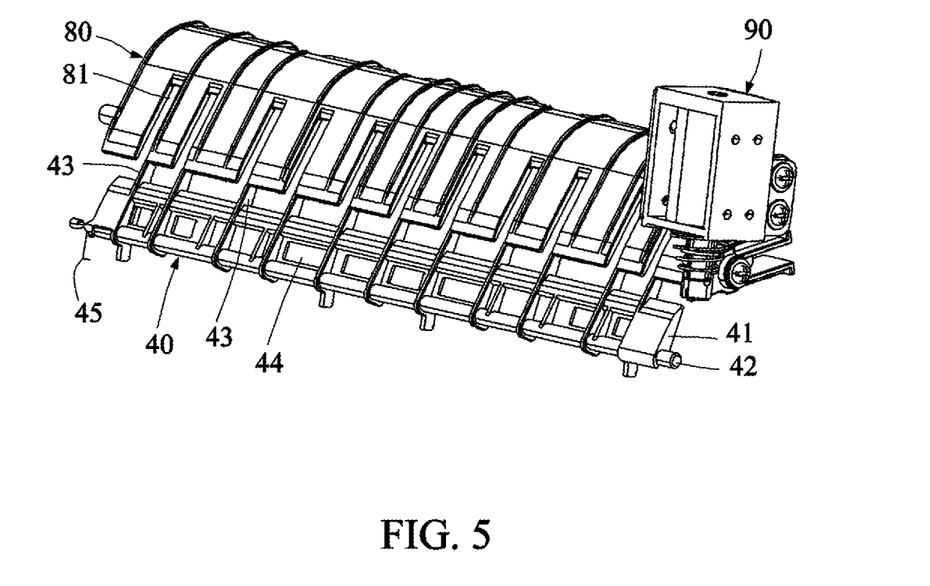
FIG. 5 is a pictorial view showing the switching gate in a second state.
Figure 6:
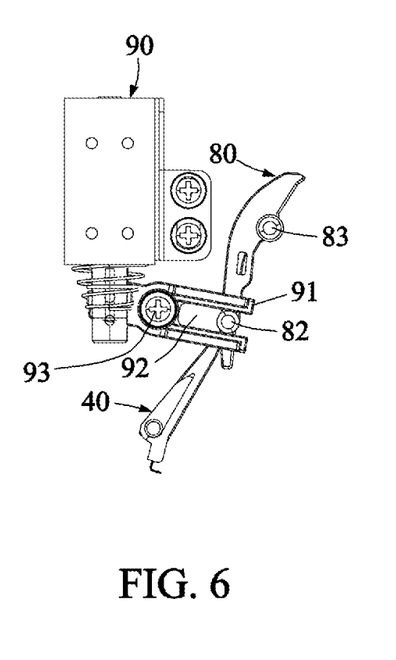
FIG. 6 is a front view showing mechanisms under an actuator.

FIG. 4 is a pictorial view showing a switching gate in the first state. FIG. 5 is a pictorial view showing the switching gate in the second state. FIG. 6 is a front view showing mechanisms under an actuator. Referring to FIGS. 3A to 3D and FIGS. 4 to 6, the guide member 40 includes a body 41 and multiple blades 43. The body 41 has a pivot 42 mounted on a body structure of the peripheral 100, wherein no active actuator is provided to drive the guide member 40. The blades 43 are separately mounted on the body 41. The blades 43 arranged in one row are directly pushed away by the medium M to distribute the pushing force of the medium M and prevent the stress concentration. The body 41 of the guide member 40 has multiple hollow portions 44 to reduce the weight. In addition, an optional torsion spring 45 can provide the pre-loading.

It is worth noting that there is no specific state present between the switching gate 80 and the guide member 40, so the state of the guide member 40 is not particularly discussed in FIGS. 4 and 5. In order to prevent the guide member 40 and the switching gate 80 from interfering with each other, the switching gate 80 may have multiple grooves 81. So, when the guide member 40 is rotated relatively to the switching gate 80, the blades 43 are movably accommodated within the grooves 81, respectively.

It is understandable that the peripheral 100 including the switching gate 80 may selectively include the guide member 40. In this case, the peripheral having the switching gate is provided, wherein the switching gate can switch between the first state and the second state to divide the second passage 20 into the bidirectional passage 21 and the unidirectional passage 22 to facilitate the reversing process of the medium M.

In addition, referring to FIGS. 3A to 3D and FIGS. 4 to 6, the peripheral 100 may further include an actuator 90 for actuating or driving the switching gate 80 to switch between the first state and the second state. In one example, the actuator 90 includes a solenoid. After a control arm 91 of the actuator 90 has been driven, the control arm 91 is rotated about a pivot 93, so that a pivot 82 of the switching gate 80 moves in a guide slot 92 of the control arm 91, and that the switching gate 80 can enter the first state and the second state. In this embodiment, the switching gate 80 has two pivots 82 and 83, wherein an axial position of the pivot 83 is kept fixed with respect to the body of the peripheral (e.g., relative to the output tray 70), while an axial position of the pivot 82 is in a floating state with respect to the body of the peripheral so that the pivot 82 can move in conjunction with the guide slot 92.

Because no actuator is used to drive the guide member 40, the guide member 40 can be configured to rest against a first passage wall W1 of the peripheral 100 by a self weight to keep normally closing the forward path PF. On the other hand, the self weight of the guide member 40 can be used to restrict the guide member 40 from being rotated, by the medium M, to exceed or go beyond a vertical state. In this case, the guide member 40 permanently opens the path from the second passage 20 to the third passage 30. Of course, a second passage wall W2 of the peripheral 100 may also be used to restrict the guide member 40 from being rotated, by the medium M, to exceed the vertical state. The advantage of restricting the guide member 40 from being rotated to exceed the vertical state is that no other drive force or mechanism is required to rotate the guide member 40 to rest against the first passage wall W1 because the presence of other drive force or mechanism would affect whether the medium M can push the guide member 40. In one example, the work angle of the guide member 40 (an included angle between the guide member 40 and the horizontal line) ranges from 50 degrees to 75 degrees, and preferably ranges from 54 degrees to 67 degrees to keep the normal function thereof. In another example, the rotatable angle of the guide member 40 (the included angle between the guide member 40 and the horizontal line) ranges from 50 degrees to 89 degrees.

With the above-mentioned configurations, no actuator is required to drive the guide member 40, and no special passage structure needs to be designed to keep the normal transporting path. Therefore, a horizontal dimension 70D of the peripheral 100 in FIG. 2 can be shortened, and the cost of the peripheral 100 can be decreased.

With the peripheral of the above-mentioned embodiment, no additional driving mechanism is required to perform the active control, and the larger space is not needed for the design of the connection portion of these sub-passages. So, the size and the cost of the peripheral can be decreased, and this is quite beneficial to the current requirements of the low cost and the slim and light properties.

It is worth noting that all the above embodiments can be combined, replaced or modified interactively as appropriate to satisfy the diversified requirements.

The specific embodiments proposed in the detailed description of this disclosure are only used to facilitate the description of the technical contents of this disclosure, and do not narrowly limit this disclosure to the above-mentioned embodiments. Various changes of implementations made without departing from the spirit of this disclosure and the scope of the claims are deemed as falling within the following claims.

What is claimed is:

1. A peripheral with a pivotal turn-over guiding mechanism, the peripheral comprising:
   a transporting mechanism;
   a first passage;
   an image processing unit disposed on the first passage;
   a second passage connected with the first passage, wherein the image processing unit performs a first image process on a first side of a medium, and then the transporting mechanism transports the medium to the second passage;
   a third passage connected with the first passage and the second passage, wherein the transporting mechanism transports the medium, which has encountered the first image process, partially out of and back into the second passage, into the third passage, and then into the first passage from the third passage, so that the image processing unit performs a second image process on a second side of the medium, wherein the second passage comprises: a bidirectional passage connected with the first passage, the third passage and an output tray, wherein the transporting mechanism transports the medium past the bidirectional passage in a forward direction and in a reverse direction; and a unidirectional passage connected with the first passage, the third passage and the output tray, wherein the transporting mechanism transports the medium past the unidirectional passage in the forward direction;

a guide member, which is rotatably disposed at a connection portion of the third passage, the second passage and the first passage, normally closes a forward path from the first passage to the second passage, and normally opens a reverse path from the second passage to the third passage, wherein the medium coming from the first passage pushes the guide member to open the forward path, and the medium coming from the second passage is guided into the third passage by the guide member without entering the first passage; and a switching gate, which is disposed between the bidirectional passage and the unidirectional passage, and switches between a first state and a second state, wherein:

in the first state, the medium enters the bidirectional passage from the first passage, and enters the third passage from the bidirectional passage; and in the second state, the medium enters the unidirectional passage from the first passage.

2. The peripheral according to claim 1, wherein the guide member comprises:
a body having a pivot; and
multiple blades separately mounted on the body.

3. The peripheral according to claim 1, wherein:
the guide member comprises: a body having a pivot; and multiple blades separately mounted on the body; and
the switching gate has multiple grooves, wherein when the guide member is rotated relatively to the switching gate, the blades are respectively movably accommodated within the grooves.

4. The peripheral according to claim 1, further comprising:
an actuator actuating the switching gate to switch between the first state and the second state.

5. The peripheral according to claim 1, wherein the guide member rests against a first passage wall of the peripheral by a self weight to normally close the forward path.

6. The peripheral according to claim 5, wherein a second passage wall of the peripheral restricts the guide member from being rotated, by the medium, to exceed a vertical state.

7. The peripheral according to claim 5, wherein the self weight of the guide member restricts the guide member from being rotated, by the medium, to exceed a vertical state.

8. The peripheral according to claim 1, wherein the image processing unit is a printing module for printing data on the medium.

9. The peripheral according to claim 8, wherein the image processing unit comprises a pressure roller and a heating roller, which cooperate with each other to perform a fixation process on toner on the medium.

10. The peripheral according to claim 8, wherein the first image process and the second image process performed by the printing module comprise a high-temperature fixation process, and the guide member is a hard member or a member that can withstand a high temperature of the high-temperature fixation process so that the guide member cannot be softened and become failed due to an influence of the high temperature.

11. The peripheral according to claim 1, wherein the image processing unit is an optical image scanning module for acquiring an image of the medium.

12. The peripheral according to claim 1, wherein the forward path is an upward path, and the reverse path is a downward path.

13. The peripheral according to claim 1, wherein no actuator is provided to actuate the guide member.

14. The peripheral according to claim 1, wherein an outlet of the unidirectional passage is disposed below an outlet of the bidirectional passage.

15. The peripheral according to claim 1, wherein an outlet of the unidirectional passage is disposed between an outlet of the bidirectional passage and the image processing unit.

* * * * *